June 26, 1962     J. T. LAING ETAL     3,041,451

AUTOMATIC FREQUENCY SEARCH AND FOLLOWING RECEIVER

Filed March 5, 1954     2 Sheets-Sheet 1

INVENTORS
JOSEPH T. LAING
ARTHUR NELKIN
BY
G. D. O'Brien
E. C. Walsh
ATTORNEYS

INVENTORS
JOSEPH T. LAING
ARTHUR NELKIN
ATTORNEYS

United States Patent Office 3,041,451
Patented June 26, 1962

3,041,451
AUTOMATIC FREQUENCY SEARCH AND FOLLOWING RECEIVER
Joseph T. Laing, Sharon, and Arthur Nelkin, Pittsburgh, Pa., assignors, by mesne assignments, to the United States of America as represented by the Secretary of the Navy
Filed Mar. 5, 1954, Ser. No. 414,527
4 Claims. (Cl. 325—470)

This invention relates to narrow band receivers and in particular to a narrow band receiver which can search and follow a received signal of variable frequency.

The receiver forming this invention is a component of a continuous wave acoustic guidance system described and claimed in U.S. patent application No. 414,525, filed March 5, 1954 by William H. Hamilton and Arthur Nelkin and entitled Continuous Wave Acoustic Guidance System. In the above identified active acoustic guidance system for a torpedo, acoustic energy at a substantially constant frequency is continuously transmitted. The frequency of the target signal is the frequency of the transmitted acoustic energy reflected from a target plus the Doppler shift due to the relative velocity of the torpedo with respect to the target. Transmitter leakthru and reverberation are attenuated by the use of filters preceding the receiver constituting this invention. The target signal is received with a four-quadrant magnetostrictive transducer, the relative phase of the voltages from the left and right quadrants, and from the upper and lower quadrants, depending upon the relative bearing and elevation of the target. These phase-differing voltages are transformed to amplitude-differing voltages by means of a phase-to-amplitude converter. A lobe commutator commutates the four output voltages from the phase-to-amplitude converter twice per second and combines the resultant signals to produce a two cycle per second amplitude-modulated target signal. The phase of the modulation envelope provides steering information which the system uses in homing on the target. In the above identified guidance system the frequency search and following receiver scans a given frequency spectrum for possible target signals, and if any are present, the receiver must "lock on" the target signal and continuously track, or follow, the target signal.

A very narrow band width receiver is desirable in order to obtain the maximum improvement in the signal to noise ratio. The use of a narrow band width makes the design of an automatic frequency search and following receiver much more difficult than when a wider band width is used. This is due to abrupt amplitude and phase variations encountered in the band pass filters. These abrupt changes, coupled with the possibility of "ringing" when tuning past target signals, necessitates a servo system having a high degree of stiffness and damping if the target signal is to remain in the passband of the receiver. In the receiver constituting this invention a 12 kilocycle bandpass filter having a band width of only 10 cycles at the 3-db down points is used. Steering information is contained in the two cycle per second amplitude modulation of the target signal. Consequently in order to retain both the upper and lower sidebands of the target signal and thus prevent distortion of the steering information, the center frequency of the discriminator of the receiver must not vary by more than ±3 cycles.

It is, therefore, an object of this invention to provide a narrow band receiver capable of searching for and following an amplitude modulated signal of variable carrier frequency.

A further object of this invention is to provide a frequency search and following receiver which has a high signal to noise ratio.

It is a still further object of this invention to provide a receiver that eliminates the necessity of keeping the components thereof very accurately aligned.

Other objects and many of the attendant advantages of this invention will be readily appreciated as the same become better understood by reference to the following detailed description when considered in connection with the accompanying drawings wherein.

Figure 1:
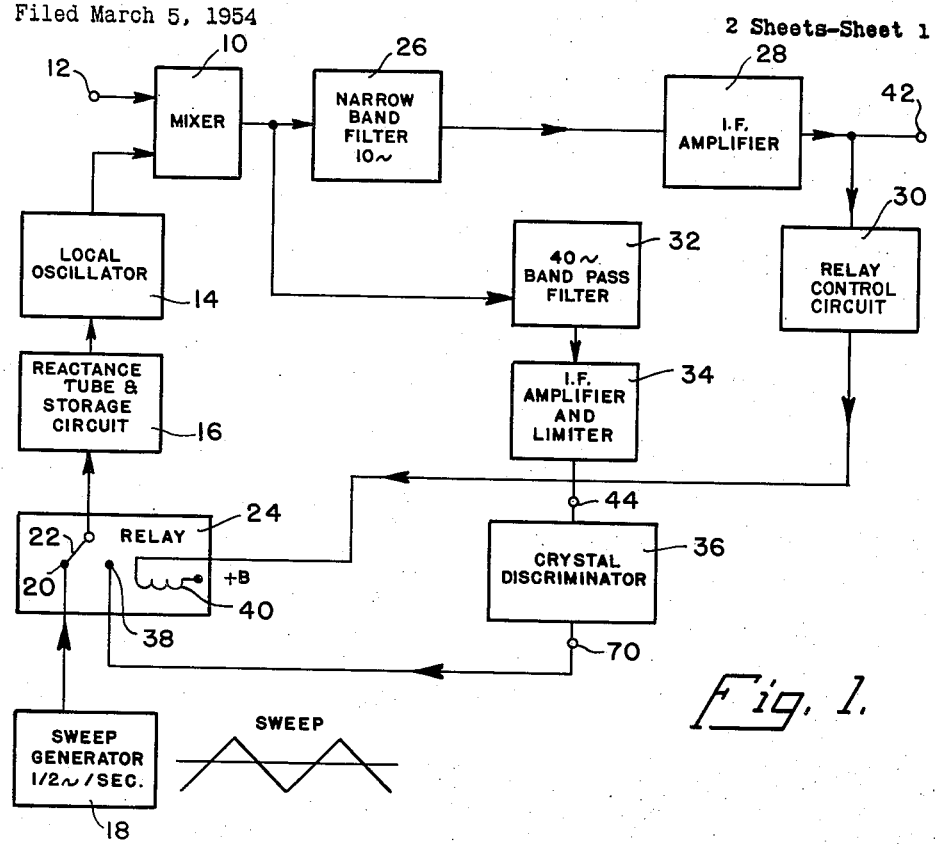
FIG. 1 is a block diagram of the search and following receiver.

Referring to FIG. 1, an amplitude modulated variable carrier frequency input signal is adapted to be applied to mixer 10 through terminal 12. The input signal is heterodyned in mixer 10 with the output signal of local oscillator 14 to produce an output signal of the mixer whose frequency is equal to the difference in frequencies between the input signal and the output signal of local oscillator 14. The frequency of local oscillator 14 is controlled by a conventional reactance tube and storage circuit 16. The searching function of the receiver is accomplished by varying the frequency of local oscillator 14 over a predetermined band of frequencies, in a preferred example from 72 to 75 kc., by means of the output voltage of sweep generator 18 which is applied to reactance tube circuit 16 through contact 20 and movable element 22 of relay 24. Sweep generator 18, in a preferred form, supplies a triangular voltage sweep of one-half cycle per second, or one complete sweep per second as seen in FIG. 1. The intermediate frequency output signal of mixer 10 is then applied to a narrow band filter for noise reduction in the signal channel and for lock control, and to a broader band filter in the automatic frequency control channel. The narrow band channel for lock control consists of filter 26, I.F. amplifier 28, and relay control circuit 30. The automatic frequency control channel consists of band pass filter 32, I.F. amplifier and limiter 34, crystal discriminator 36, reactance tube circuit 16 and local oscillator 14. The output signal of discriminator 36 is applied to contact 38 of relay 24. The output of discriminator 36 is applied to reactance tube circuit 16 when I.F. amplifier 28 delivers a signal to relay control circuit 30 which controls energization of coil 40 of relay 24 and causes movable element 22 to engage contact 38.

While relay control circuit 30 can of course be arranged to either energize or de-energize relay 24 in response to an amplified signal delivered to relay control circuit 30, the energization arrangement is here shown as the specific mode for switching from sweep generator to discriminator control. For this purpose, relay control circuit 30 may utilize the conventional technique of deriving, by rectification of the intermediate frequency signal delivered thereto, a positive voltage, and employing said positive voltage to increase the plate current of a relay-controlling tube, thus energizing the relay in response to passage of a signal through narrow-band filter 26.

Figure 3:
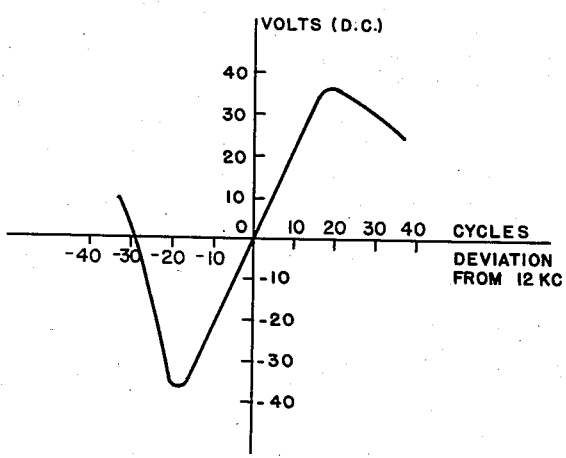
FIG. 3 is a plot of the output of the discriminator plotted against deviation of the input signal.

Narrow band filter 26 is a crystal filter having a band width of 10 cycles at the 3 db down points. The center frequency of the filter is at an intermediate frequency which in a preferred example is 12 kilocycles. Filter 32 in the second, or automatic frequency control channel, is an L-C band pass filter which has a pass band, in a preferred example, of 40 cycles per second. Discriminator 36, detailed in the schematic shown in FIG. 2, has incorporated therein a crystal which keeps the center frequency of the discriminator aligned with the center frequency of filter 26. In a preferred example, the sensitivity of the discriminator 36 is about 2.5 volts per cycle, as seen in FIG. 3, and the sensitivity of the reactance tube local oscillator circuit is 3.75 kilocycles per volt.

In operation, control of the reactance tube circuit 16 by sweep generator 18 causes local oscillator 14 to sweep through a specified range of frequencies until a target signal is received and until the intermediate frequency of the output signal of mixer 10, which is equal to the difference between the frequency of the input signal and that of local oscillator 14, at some instant during the sweep cycle comes within the pass band of filter 26. When this occurs, the output signal of mixer 10 is amplified by amplifier 28 and applied to relay control circuit 30 in addition to terminal 42 which may lead to a demodulator and other circuits (not shown) in the signal channel. The output of I.F. amplifier 28 is utilized in relay control circuit 30 to effect energization of coil 40 of relay 24 and thereby to connect the output of discriminator 36 to the reactance tube and storage circuit 16. The output signal of mixer 10 during lock-up condition is automatically maintained at substantially constant intermediate frequency, in this instance at 12 kilocycles, and the modulation envelope of the output signal of I.F. amplifier 28, during discriminator control of the local oscillator, remains substantially in phase with the modulation envelope of the input signal to mixer 10.

Figure 2:
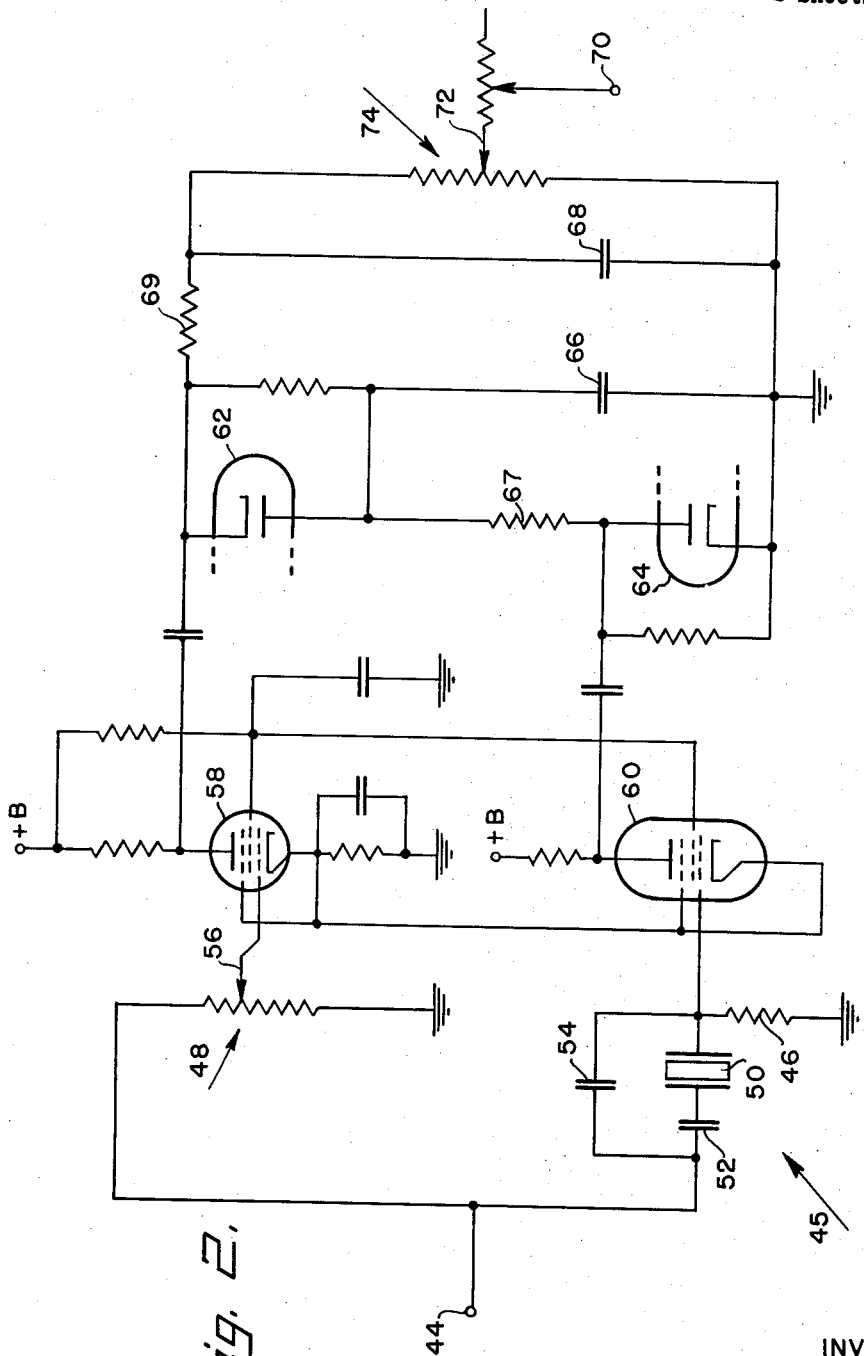
FIG. 2 is a schematic diagram of a discriminator.

FIG. 2 is a schematic diagram of discriminator 36. The output signal of I.F. amplifier and limiter 34 is applied to terminal 44 and thence across network 45 and potentiometer 48. Network 45 consists of resistor 46, crystal 50, condenser 52, and condenser 54. The impedance of this network varies as a function of the frequency of the applied signals, the 12 kilocycle center frequency being bracketed between zero and pole of the impedance characteristic of crystal 50. As the impedance of network 45 decreases, the voltage across resistor 46 increases. The amplitude of the voltage picked off by arm 56 of potentiometer 48 is insensitive to frequency changes and remains substantially constant. The voltage across resistor 46 and the voltage picked off by arm 56 are amplified by conventional amplifier circuits including pentodes 58 and 60. The output signals of the amplifiers are then rectified by circuits including diodes 62 and 64, filtered by condensers 66, 68 and resistors 67, 69 and added algebraically to obtain an output voltage characteristic as illustrated. The magnitude of the output voltage of discriminator 36 at terminal 70 is determined by the setting of arm 72 of potentiometer 74 and the frequency of the signal applied to terminal 44 as shown in FIG. 3.

The use of crystal 50 maintains the center frequency of discriminator 36 in accurate alignment with the center frequency of narrow band filter 26. The signal voltage limiting action of preceding limiter 34, and the later amplification of voltages developed at potentiometer arm 56 and across resistor 46 of the discriminator crystal network, relieve and protect crystal 50 from shattering by overexcitation, while providing high D.C. output at terminal 70. Discriminator 36 can be adjusted for zero output voltage when the frequency of the signal applied to terminal 44 is at the center frequency of filter 26, by potentiometer 48.

By the use of a wider band width filter in the automatic frequency control channel, abrupt amplitude changes, "ringing," and limited pull-in range are eliminated from this channel. The use of two channels also eliminates the necessity of keeping components of the circuit accurately aligned to a very high degree since the crystals in discriminator 36 and filter 26 are cut so that the center frequency of the filter and the discriminator are the same. The receiver still maintains the advantage of a high signal to noise ratio of a narrow band receiver despite the fact that the automatic frequency control circuit or channel is moderately wide, since the steering information and the relay lock operation are controlled by the signal from narrow band filter 26.

Obviously many modifications and variations of the present invention are possible in the light of the above teachings. It is, therefore, to be understood that within the scope of the appended claims the invention may be practiced otherwise than as specifically described.

What is claimed is:

1. A narrow band frequency search and following receiver, comprising a mixer adapted to have applied thereto an input signal of variable carrier frequency having a modulation envelope, a local oscillator, the output of said local oscillator being applied to said mixer, a first narrow band channel and a second broader band channel to which are separately applied the output signal of said mixer, said first channel adapted to yield an output signal of substantially constant intermediate frequency having a modulation envelope in phase with the modulation envelope of the input signal, said second channel adapted when connected to said local oscillator to regulate the frequency of said local oscillator to keep the frequency of the output signal of said mixer in the center of the narrow band width of said first channel, means for periodically varying the frequency of said local oscillator over a predetermined band of frequencies, and means controlled by said first channel to disconnect said means for periodically varying the frequency of said local oscillator and to connect said second channel to said local oscillator when the frequency of the output signal of said mixer is such as to pass through said first channel.

2. A narrow band frequency search and following receiver adapted to have applied thereto a variable carrier frequency amplitude modulated input signal, comprising a mixer to which said input signal is applied, a first channel comprising a narrow band filter, a first I.F. amplifier, and a relay control circuit, a second channel comprising a second broader band filter, a second I.F. amplifier, a discriminator, a relay, a reactance tube and storage circuit, a local oscillator, and said mixer, search means comprising a sweep generator, said relay, said reactance tube circuit and said local oscillator, said first and second channels connected to have the output of said mixer applied separately thereto, said relay adapted to connect the output of said sweep generator to the reactance tube circuit to cause the local oscillator to sweep a predetermined band of frequencies, said relay control circuit adapted to cause said relay to connect the output of said discriminator to said reactance tube circuit and disconnect the sweep generator when the frequency of the output of said mixer lies within the pass band of said first filter, said discriminator adapted to thereafter control the frequency of the local oscillator to maintain the frequency of the output of said mixer centered in the pass band of said first filter, the output signal of said receiver being the output signal of said first I.F. amplifier.

3. A narrow band frequency search and following receiver comprising a mixer adapted to have applied thereto an input signal of variable carrier frequency having a modulation envelope, a local oscillator for said mixer, the output signal of said mixer being at intermediate frequency equal to the difference between the carrier frequency of said input signal and the frequency of the local oscillator, means for periodically varying the frequency of said local oscillator, over a predetermined range of frequencies, comprising a reactance tube and storage circuit and a sweep generator, a first narrow band channel and a second broader band channel to each of which is separately applied the output signal of said mixer, said first channel comprising a narrow band filter, an intermediate frequency amplifier, and a relay control circuit, said first channel adapted to yield an intermediate frequency amplifier output signal of substantially constant intermediate frequency, the modulation envelope of which is in phase with the modulation envelope of the input signal, said second channel comprising a broader band pass filter, an amplifier, a discriminator, said reactance tube circuit, and said local oscillator, said second channel, adapted, when the output of said discriminator is connected to said reactance tube, to regulate the frequency of said local oscillatoar so that the frequency of the output signal of said mixer lies substantially in the center of the narrow band pass filter of said first channel, and relay means controlled by the relay control circuit of said first channel to disconnect said sweep generator from said reactance tube and storage circuit and to connect the output of the discriminator of said second channel to the reactance tube and storage circuit when the frequency of the output signal of said mixer lies within the band pass width of the filter of said first channel.

4. A narrow band frequency search and following receiver comprising a mixer adapted to have applied thereto an input signal of variable carrier frequency having a modulation envelope, a local oscillator for said mixer, the output signal of said mixer being at intermediate frequency equal to the difference between the carrier frequency of the input signal and the frequency of the local oscillator, a reactance tube and storage circuit for adjusting the frequency of the local oscillator, a relay, a sweep generator, said relay adapted when de-energized to connect the output of said sweep generator to the reactance tube and storage circuit to vary periodically the frequency of the local oscillator over a predetermined band of frequencies, a narrow band channel and a broader band channel each connected to have the output signal of said mixer applied separately thereto, said narrow band channel comprising a narrow band crystal filter, an I.F. amplifier, and a relay control circuit, said narrow band channel adapted to yield an I.F. amplifier output signal of substantially constant intermediate frequency and having a modulation envelope which is substantially in phase with the modulation envelope of said input signal, said second channel comprising a band pass L-C filter, an intermediate frequency amplifier, and a crystal discriminator, the output of said discriminator adapted to be connected to the reactance tube and storage circuit when said relay is energized, the relay control circuit of said narrow band channel adapted to energize said relay when the frequency of the output signal of said mixer lies within the band pass of the crystal filter.

References Cited in the file of this patent

UNITED STATES PATENTS

| | | |
|---|---|---|
| 2,063,295 | Braden | Dec. 8, 1936 |
| 2,250,519 | Beers | July 29, 1941 |
| 2,283,523 | White | May 19, 1942 |
| 2,369,542 | Dietrich | Feb. 13, 1945 |
| 2,499,858 | Gull | Mar. 7, 1950 |
| 2,501,003 | Pifer | Mar. 21, 1950 |
| 2,572,926 | Gull | Oct. 30, 1951 |
| 2,585,640 | Everitt | Feb. 12, 1952 |
| 2,594,263 | Munster | Apr. 22, 1952 |